Patented July 9, 1940

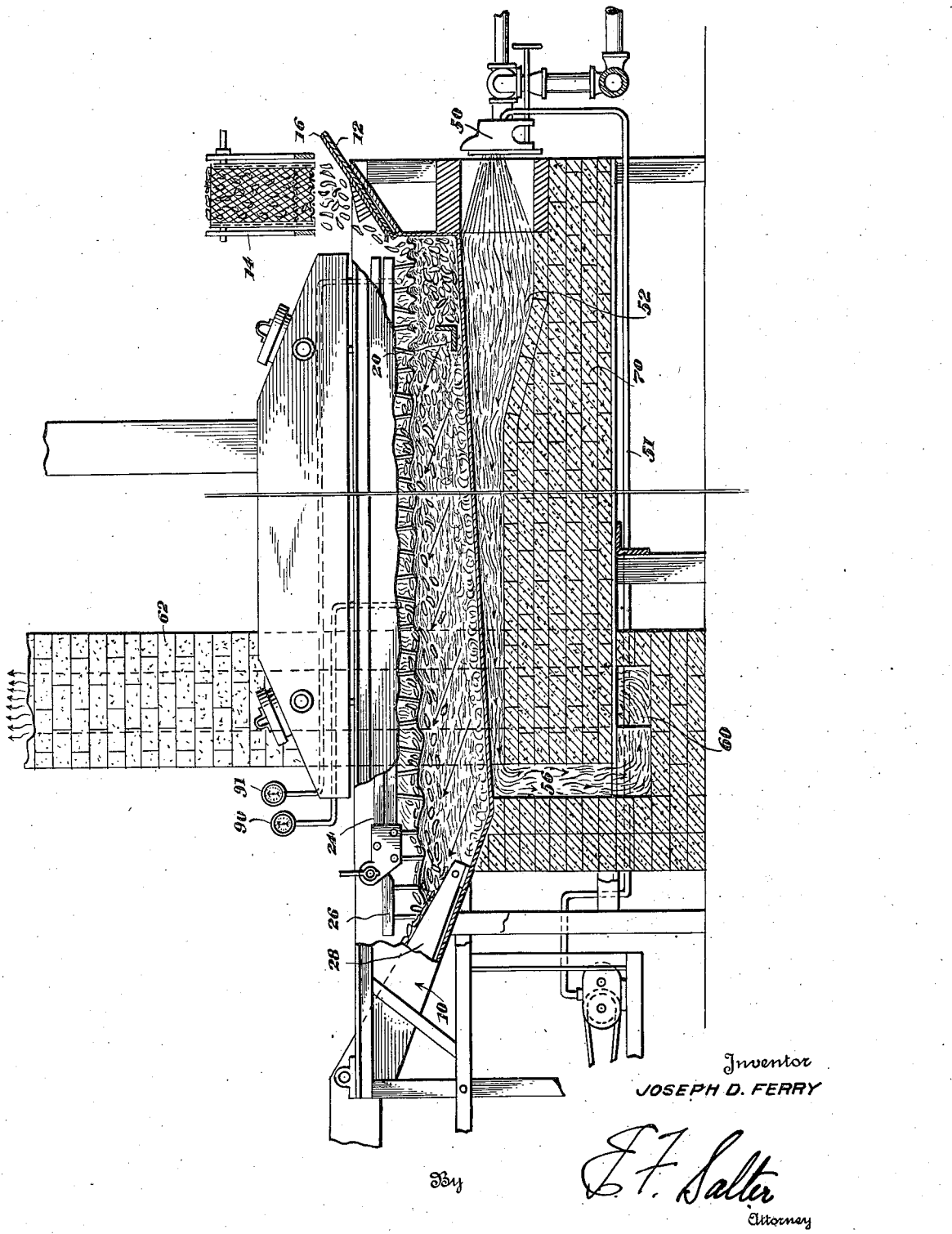

2,207,316

UNITED STATES PATENT OFFICE 2,207,316

METHOD OF HANDLING AND COOKING FOOD PARTICLES IN LIQUID COOKING BATHS

Joseph D. Ferry, Harrisburg, Pa.; Sylvia O. Ferry, executrix of said Joseph D. Ferry, deceased Original application May 22, 1935, Serial No. 22,892. Divided and this application September 27, 1938, Serial No. 231,962

4 Claims. (Cl. 53—21)

This invention relates to the art of food handling and cooking and the present application is a division of my prior copending application, Serial No. 22,892, for Food preparing and handling apparatus, filed May 22, 1935 which has matured as Patent Number 2,174,555.

The present invention has special reference to the method of handling and cooking food particles in those classes of food manufacturing equipment which embody liquid cooking baths into which prepared food particles are introduced at one point and progressed therethrough to a point of removal.

An object of the invention is to provide a method of handling and cooking food particles in liquid baths, wherein progression of the food particles through the bath is effected by means of directional movement of the bath liquid procured through the creation and maintenance of temperature differences in different portions of the bath.

Another object is to provide a method of handling and cooking food particles in liquid baths in which the particles are initially non-buoyant and of a higher specific gravity than the bath, wherein the food particles upon entering the bath are subjected to a temperature of bath elevated relative to all other portions of the bath and sufficiently intense to dehydrate and render buoyant the particles of food, so that they rise to the surface of the bath.

Still another object is to provide a novel method of handling food particles in liquid cooking baths, by maintaining the bath in a state of ebullition of gradually diminishing force from the point of inlet of the food particles in the direction of their point of removal, whereby the food particles are physically moved by the resulting bath currents from their point of inlet to their point of outlet.

A still further object resides in the provision of a novel method of moving food particles progressively through a bath of cooking liquid by heating the liquid in a manner to set up convection currents therein of decreasing velocity from the point at which the food is introduced to the bath to the point at which it is removed, combined with mechanical means for controlling movements of food particles carried by such convection currents.

Other objects will be apparent from their description.

The single figure of the drawing is a fragmentary vertical sectional view through an apparatus, here shown as a potato chip frying unit, by which the method of the invention is practiced.

The apparatus illustrated in the drawing and herein described is that illustrated and described in my United States Patent No. 2,056,845, issued October 6, 1936.

In the drawing, the numeral 10 generally designates a frying kettle or vat adapted for the reception of an appropriate quantity of oil or other liquid for cooking potato slices. The kettle has a greater length than width and is provided with an inlet having an inclined bottom 12 for the reception of potato slices or the like. Suitable means such as a conveyor 14 may be employed to furnish a regulated supply of potato slices or other food products to the kettle.

The inlet 12 declines in the direction of the kettle bottom and has mounted thereon a receiving plate 16 cooperating with the inclined inlet end portion of the kettle to define an air space for cooling purposes. As will appear, the heat at the inlet portion of the kettle is intense, more so than at other points within the kettle, and it has been found that by spacing the plate 16 from the inlet end or inclined portion thereof, the resulting air space avoids overheating of the plate 16 and thus prevents the entering potato slices from sticking to the plate, or becoming scorched thereby.

When the potato slices or other food products enter the kettle by way of the inclined receiving plate 16, they settle to the kettle bottom. An L-shaped baffle or guard 20 extends entirely across the kettle at a point removed from the inlet end, so as to cooperate with the inlet or anterior portion thereof in defining an initial cooking chamber and at the same time acting as a dam preventing the uncooked potato slices from creeping along the bottom of the tank. In other words, the baffle or dam 20 serves to arrest substantial advance of the potato slices until they have become sufficiently buoyant by cooking to rise above the baffle.

If desired, there may be several suitably spaced baffles corresponding to the member 20 and such an arrangement will be found to be especially advantageous when working with potatoes from different sources, some requiring a longer time than others for frying. It requires some slices longer than others to lighten under the initial cooking to a point where the same will rise to the surface of the cooking liquid or to a point above the level of the dam, and when the slices do rise the further cooking period is about the same for all the slices. The dam thus cooperates with the inlet end of the kettle in the formation of a chamber for the initial cooking of potato slices or other food products.

The baffle or dam 20 is spaced slightly above the bottom of the kettle to define an intervening space or passage for the movement of the fine sediment which forms on the bottom of the kettle and creeps along the same towards one end thereof. Were the baffle in engagement with the bottom of the kettle, there would be caused a congestion of the sediment behind the baffle.

The regulated travel of the potato slices through the cooking liquid is brought about, in part, by the action of a plurality of spaced parallel rake-like longitudinally extending impellers 24 having depending tines adapted to extend slight distances into the cooking liquid and engage the potato slices therein. The motion of the tines through the cooking liquid is one-way and the return stroke of the tines is slightly above the level of the liquid and the food products therein. By this arrangement there is maintained a generally one-way motion of the potato slices through the cooking liquid. The impellers carry puddling devices 26 by which the potato slices at the outlet portion of the kettle are directed onto a discharge conveyor 28.

Appropriate means, not detailed, are employed to reciprocate the impellers through substantially oblong orbits. Any suitable mechanism may be utilized.

A source of heat 50 is located below the kettle at its inlet or anterior end portion. In the embodiment shown the heat source is preferably a fluid fuel burner of the pressure type, located at the anterior end of a combustion chamber 52 extending longitudinally of the kettle below the same for the conduct of the products of combustion longitudinally below the kettle from the inlet to the outlet or posterior end portion thereof. A compressed air feed line 51 connects with the heating unit 50 to furnish compressed air thereto for mixture with the oil, gas or other fuel. The air pressure may be fairly constant, possibly five pounds, and the range of heat may be varied by varying the stack draft, although if desired, the range of heat may be varied by a corresponding variation of the compressed air supply. The combustion chamber is provided adjacent to the outlet end of the kettle with a downwardly directed branch 56 shown to have full communication with a rearwardly directed branch 60 by which the products of combustion are conducted into a stack 62.

Since the heating source is located solely at the inlet portion of the kettle it imparts to the cooking liquid at the inlet end a higher temperature than that prevailing in the relatively advanced portion of the kettle. More particularly, the heat striking the kettle bottom at the inlet end portion thereof passes along the under side of the kettle for its full length, being directed through the combustion chamber 52 between the kettle and the base 70. The combustion chamber extends for the full width of the kettle and the heat source is sufficient to heat the cooking liquid entirely across the kettle and for its full length.

The invention has special reference to the heating of the kettle contents and will be found to provide a definitely variable differential as between the temperature of the cooking liquid in the inlet end portion of the kettle or in the initial cooking chamber thereof on one hand, and in the remaining or posterior portion of the kettle on the other hand.

That is to say, the manner of applying heat provides a uniformly tapering kettle heat from the inlet to the outlet of the kettle.

In explaining the means for achieving a definitely and uniformly tapering kettle temperature it is pointed out that by varying the draft within the combustion chamber 52 or by increasing the air pressure employed for mixture with the gas or oil, as the case may be, the kettle temperature is raised in the outlet or posterior portion of the kettle as compared to the temperature at the inlet end portion, cutting down the decline or taper in the kettle temperature.

On the other hand, by diminishing the draft within the combustion chamber, or by decreasing the air pressure to the heating unit, the temperature within the advanced portion of the kettle is lowered. In this way, the temperature differential in the anterior and posterior portions of the kettle is regulated to suit the particular potatoes being cooked, and to produce chips of a superior quality, while at the same time, this arrangement provides for maximum production.

It will be seen that the inlet and intermediate portions of the kettle have connection with temperature gauges 90 and 91 and such gauges provide a means for determining the relative temperatures of the cooking liquid at longitudinally spaced points within the kettle, from which the operator is guided in the regulation of the fuel supply and the draft through the combustion chamber.

The kettle bottom is downwardly inclined from its inlet end in the direction of its outlet end, so that it is progressively and uniformly increased in depth toward its outlet end portion. This arrangement provides a further means of effecting the tapering in temperature of the cooking liquid. Since the depth of the kettle liquid is increased toward the outlet end thereof, the temperature of such liquid is correspondingly diminished, and gradually, in the direction of the kettle outlet. The decline of the kettle bottom correspondingly diminishes the cross-sectional area of the combustion chamber towards its outlet end and has the effect of increasing the density of the products of combustion, thereby securing maximum fuel efficiency.

The heating unit 50 is so disposed as to direct the maximum heat against the kettle bottom at its extreme anterior end, thus avoiding the formation of a relatively cool region into which the slices would drop upon entering the kettle such as would occur if the maximum heat application was directed somewhat inwardly of the anterior end of the kettle bottom. It has been found that the existence of a relatively low temperature at the very point where the potato slices enter the cooking oil causes a serious congestion of the slices at this point. On the other hand, when the maximum heat is directed against that part of the kettle bottom where the slices enter the liquid, the slices are immediately advanced into the region of the impellers.

The presence of relatively cool sections or regions within the kettle has the effect of shrinking the slices and results in the production of chips lacking in uniformity, while a gradually tapering heat as the slices progress along the kettle not only definitely secures the proper travel of the slices through the kettle but at the same time precludes any possibility of relatively sharp differences in temperature which might create cooling zones with the detrimental effects above noted.

The impellers 24 function primarily as a means to control the rate of progression of the potato slices through the cooking bath and also the duration or extent and frequency of their immersion beneath the surface of the oil. The ebullition of the bath constitutes an important factor in moving the slices through the kettle. The turbulence of the cooking oil produced by ebullition, which diminishes in intensity from inlet to outlet, sets up a preponderance of pressure on the trailing sides of the slices at all points in the bath, biasing them in the direction of the outlet end thereof.

An important step in the cooking method of this invention resides in the initial dehydration and surface sealing of the slices in the anterior bath zone of highest temperature to impart buoyancy to the slices and prevent them from shrinking in size and absorbing the bath liquid, so that as the cold wet chips from a washer enter the kettle and sink to its bottom they are at once directed upwardly and in an advancing path through the cooking liquid and are carried through the kettle under the influence of the convection currents set up in the liquid and continuously maintained therein by the gradually decreasing heat applied over the bottom of the kettle in the direction of its outlet end.

The velocity of such currents decreases in a proportionate respect with reference to the rate at which the bath temperature diminishes, so that without some control means the slower rate of progression of the slices at the posterior end portion of the kettle might bring about a congestion thereat and thus hold the incoming and following slices in the zone of highest cooking temperature for a longer priod of time than might be desirable. By providing the impellers 24 such a contingency is avoided for within their sphere of influence the slices engaged by their tines are positively propelled at a uniform rate and over their entire longitudinal extent. The ebullition of the cooking oil and the velocity of convection currents therein may be relatively increased or decreased as between the anterior and posterior portions of the kettle by varying the applied heat concentration as previously explained. Thus, even without the impellers 24, congestion of slices in the posterior portion may be relieved as soon as it becomes apparent, simply by increasing the temperature of the oil at that point and thereby increasing the turbulence and velocity of convection currents in the oil, which results in speeding up the movement of the slices.

It will be apparent from the foregoing description that I have provided a novel method of handling and cooking food products in cooking liquid baths, and particularly in the production of potato chips, where the food products as introduced to the bath are of a higher specific gravity than the bath liquid.

In the practice of my method the individual food particles are rendered buoyant immediately following their introduction into the bath, and are caused to progress therethrough to their point of removal, by the creation of a temperature differential in the bath liquid with respect to its anterior and posterior portions, and by applied heat regulated in a manner to promote movement of the food particles by ebullition of the bath liquid and the convection currents set up therein. The rate of progression and duration or the extent of immersion of the food particles in the bath is controlled by mechanical means operating from a point above the surface of the bath.

I claim:

1. The method of cooking potato chips in a bath of cooking liquid, which comprises delivering the raw potato chips into one end of the bath, heating the bath thereat to a high temperature sufficient to quickly encrust and render the chips buoyant, and simultaneously heating the remainder of the bath to a lower temperature which uniformly tapers and diminishes from the region of high temperature to the other end of the cooking bath.

2. The method of cooking potato chips in a bath of cooking liquid, which comprises delivering the raw potato chips into one end of the bath, heating the bath thereat to a high temperature sufficient to quickly encrust and render the chips buoyant, and simultaneously heating the remainder of the bath to a lower temperature which uniformly tapers and diminishes from the region of high temperature to the other end of the cooking bath, and controlling the movement of the chips through the bath.

3. The method of cooking food particles in a bath of cooking liquid, which comprises delivering the uncooked particles into one end of the bath, heating the bath thereat to a high temperature sufficient to quickly encrust and render the particles buoyant, and simultaneously heating the remainder of the bath to a lower temperature which uniformly tapers and diminishes from the region of high temperature to the other end of the cooking bath, whereby the rising food particles are conveyed in the direction of the other end of the bath by ebullition and convection of the bath liquid.

4. The method of cooking food particles in a bath of cooking liquid, which comprises delivering the uncooked particles into one end of the bath and passing them through the bath to its opposite end, while heating said bath of cooking liquid by projecting a heating flame longitudinally of the bath from the end thereof where the particles are delivered toward its opposite end, to subject said bath at its inlet to a high temperature sufficient to quickly dehydrate the food particles to a point of buoyancy and encrust the same, and to subject the remainder of said bath to a lower temperature which uniformly tapers and diminishes from the region of high temperature to the opposite end of the cooking bath.

JOSEPH D. FERRY.